(12) United States Patent
Cloutier et al.

(10) Patent No.: US 8,795,811 B2
(45) Date of Patent: Aug. 5, 2014

(54) RECYCLED CROSSLINKED VINYL-ALCOHOL POLYMER COATED FILMS AND METHODS TO MANUFACTURE THE SAME

(75) Inventors: Joshua R. Cloutier, Exeter, RI (US); Shichen Dou, Warwick, RI (US); Claudio Paulino, South Kingstown, RI (US); Chang Yeol Jung, North Kingstown, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 0 days.

(21) Appl. No.: 13/538,092

(22) Filed: Jun. 29, 2012

(65) Prior Publication Data

US 2014/0004301 A1    Jan. 2, 2014

(51) Int. Cl.
*D06N 7/04* (2006.01)
*C08G 63/91* (2006.01)
*C08L 29/04* (2006.01)

(52) U.S. Cl.
CPC *C08L 29/04* (2013.01); *B23B 27/30* (2013.01)
USPC ............................................ 428/141; 525/57

(58) Field of Classification Search
None
See application file for complete search history.

(56) References Cited

U.S. PATENT DOCUMENTS

| | | | |
|---|---|---|---|
| 4,704,423 | A | 11/1987 | Iwanami et al. |
| 5,286,424 | A | 2/1994 | Su et al. |
| 5,458,829 | A * | 10/1995 | Ikeda et al. ............. 264/83 |
| 6,238,606 | B1 | 5/2001 | Kunieda |
| 6,384,093 | B1 | 5/2002 | Bourland |
| 6,432,552 | B1 | 8/2002 | Onishi |
| 7,473,439 | B2 * | 1/2009 | Rogers Agent et al. ... 427/372.2 |
| 7,666,518 | B2 * | 2/2010 | Su et al. ............. 428/500 |

\* cited by examiner

*Primary Examiner* — David Sample
*Assistant Examiner* — Nicole T Gugliotta
(74) *Attorney, Agent, or Firm* — Pillsbury Winthrop Shaw Pittman LLP (57) ABSTRACT

Embodiments herein relate to a polyolefin-containing film comprising a solidified form of a melt, the melt comprising at least 1 weight percent shredded recycled crosslinked vinyl-alcohol polymer coated polyolefin material and an amount of a compatibilizing agent and/or an un-crosslinking agent configured to un-crosslink the crosslinked vinyl-alcohol in the melt, the polyolefin-containing film having an average dimple count of less than about 50 dimples/4 in$^2$, and method of manufacturing the same.

18 Claims, 7 Drawing Sheets

FIGURE 1

Figure 2 A and B

RECYCLED CROSSLINKED VINYL-ALCOHOL POLYMER COATED FILMS AND METHODS TO MANUFACTURE THE SAME

FIELD OF THE INVENTION

The present invention relates to a novel recycling method of a polyolefin film coated with EVOH, PVOH or a mixture thereof, which may or may not be crosslinked, and reuse of said recycled material back into polyolefin film production.

BACKGROUND OF THE INVENTION

Although recycling has a long history, it is only relatively recently that environmental protection and waste management issues have come to the forefront of both public and political awareness. Plastic recycling has predominately resulted from packaging applications such as packing films while other areas of polymeric waste include: construction, automotive, agriculture and electrical components.

Attempts at recycling cross-linked products have been attempted before, such as U.S. patent application Ser. No. 11/329,949 or U.S. Pat. No. 6,384,093, both of which are incorporated herein in entirety by reference. Both the '093 patent and the '949 application attempt to recycle crosslinked material through the addition of low molecular weight virgin resin through high-shear extrusion. When adding such low molecular weight species into a resin, properties can be significantly impacted, as low molecular weight species can lead to film weakness and tear propagation in the production of biaxially oriented films. Additionally, the '093 patent requires a dilution of up to 40 wt % of the recycled product with a virgin resin, further increasing the cost of the recycled product. U.S. Pat. No. 7,666,518, incorporated herein in entirety by reference, discloses a method to reprocess polyhydroxy amino ether-coated biaxially oriented polypropylene (BOPP) films using a compatibilizing agent of a functionalized polyolefin; using said reprocessed coated film back into new film; and having a low gel count. U.S. Pat. No. 5,286,424, incorporated herein in entirety by reference, discloses recycling polyolefin material, e.g. biaxially oriented polypropylene film, coated with a chlorine-containing polymer, such as polyvinylidene chloride homopolymer and/or copolymer, and having a primer therebetween by soaking the polyolefin material in a heated caustic solution until the material is separable from the chlorine-containing polymer. After separating the polyolefin material from the chlorine-containing polymer, the material is reprocessed into desired product by extrusion, molding or other product forming process.

In the production of BOPP films, the use of recycled or reprocessed propylene polymer-based pellets from waste or non-conforming BOPP films back into the core or base layer of said BOPP film is a common practice to reduce costs by replacing a portion of costlier virgin polypropylene material. Generally, the recycled material is similar in composition to the BOPP film it is being used in. This is to help maintain performance properties for the film's particular application and to maintain aesthetic appearance: It is generally desirable to have a film without gross defects such as gels, specks, excessive haze, low gloss, etc.

Some BOPP films can be modified with a skin layer to improve dramatically gas barrier properties. Such materials can either be coextruded or coated. In the case of coating, the skin layer can be applied via in-line coating (i.e. the barrier coating is done prior to transverse direction orientation in a sequential or simultaneous orientation line) or off-line coating (i.e. the barrier coating is done on a separate piece of equipment after the BOPP film is produced). Such high gas barrier materials are usually polar polymers like ethylene vinyl-alcohol (EVOH) or polyvinyl-alcohol (PVOH).

It is the objective of this invention to disclose a novel approach to allow for the re-introduction of crosslinked PVOH, EVOH, or blends thereof, into a cast, monoaxially oriented, or biaxially oriented polyolefin film.

SUMMARY OF THE INVENTION

The present invention addresses one or more of the aforementioned problems. The embodiments of the invention relate to a recycling process where a polyolefin base layer, coated with a crosslinked PVOH and low ethylene content EVOH (10 wt % or less ethylene), is re-pelletized in a specific manner that allows a new film to be constructed with the recycled material. The new film contains at least 1 wt %, but preferably at least 10 wt % of recycled material and exhibits less than about 50 dimples/4 $in^2$ in the film, preferably less than about 40 dimples/4 $in^2$ in the film, more preferably less than 30 dimples/4 $in^2$ in the film, and even more preferably less than 20 dimples/4 $in^2$ in the film. A dimple (aka "gel") is a protrusion on the surface visible by the naked eye from a distance of 15 cm, and is greater than 50 microns in diameter and is due to the incompatible crosslinked polar polymer in the non-polar polyolefin-based film.

It is the objective of this invention, that by incorporating 1-8 wt % water onto ground or shredded film containing PVOH, EVOH or a mixture thereof and optionally crosslinked, and using specific extrusion conditions and configurations, and filtration, one can successfully recycle the film for subsequent use back into new film.

BRIEF DESCRIPTION OF THE DRAWINGS

FIGS. 2 A and B: Extruder screen from Example 1 on left (2A) and extruder screen from Comparative Example 1 on right (2B).

DETAILED DESCRIPTION OF THE INVENTION

The term "recycled" means using waste or non-conforming material to manufacture a new product. Recycling involves altering the physical form of an object or material and making a new object from the altered material. One must generate waste or non-conforming material in order to recycle the waste. Therefore, if one is recycling, one would first already generate waste or non-conforming material. Reuse, which refers to using an object or material again, either for its original purpose or for a similar purpose, without significantly altering the physical form of the object or material, is not recycling because reuse does not alter the physical form of an object. Reuse is preferred to recycling because reuse consumes less energy and fewer resources than recycling. However, reuse is not always possible, particularly for a polymer that has already been formed into an object and the polymer then has to be used in a new and different object. Of course, recycling generally consumes less energy and resources than making new replacement objects with unrecycled (i.e., new or virgin) material.

Films have long sought to incorporate EVOH (ethylenevinyl-alcohol) and PVOH (polyvinyl-alcohol) polymers to improve oxygen and aroma barrier properties. Polyolefin films have long been a preferred substrate for these coatings due to their good cost to performance ratios, particularly for food packaging applications. Films with these coatings can significantly enhance shelf-life of many dry food products, reducing spoilage and increasing distribution times.

Figure 1:
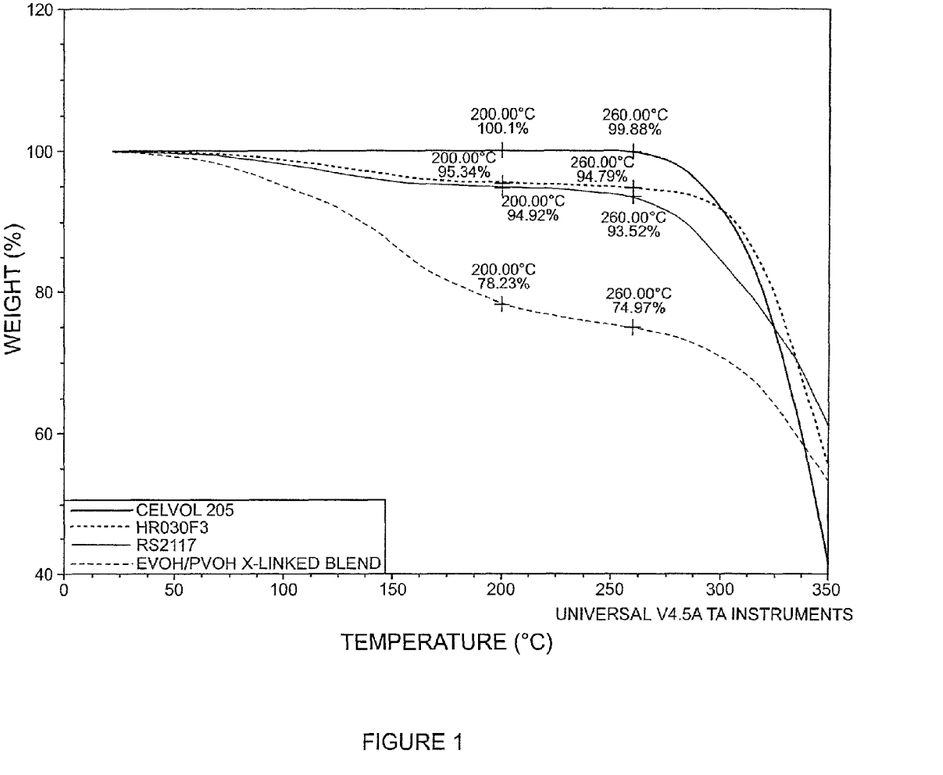
FIG. 1: Thermo-gravimetric analysis (TGA) plot of PVOH, EVOH, Crosslinked EVOH/PVOH Blend and Virgin Polypropylene.

Applicant found that a significant detriment to these coatings is the general inability to recycle them into highly demanding applications such as thin films. It is highly desirable to recycle scrap generated into the same film in order to keep the overall cost down by the displacement of more expensive virgin resin. PVOH and EVOH, particularly those of low ethylene content (e.g. less than 30 wt % ethylene), can be very difficult to recycle due to their lower degradation temperatures. FIG. 1 shows TGA (thermo-gravimetric analysis) degradation results indicating approximately 5% weight loss of some PVOH grades at 200° C., compared to no loss in a standard propylene homopolymer. This temperature is a minimum temperature for extruding polypropylene (PP), and in practice, temperatures up to 260° C. can be used in processing PP.

Additional challenges can occur when attempting to recycle cross-linked PVOH, EVOH or blends thereof. Cross-linking of vinyl-alcohol-based polymers is desirable to improve moisture resistance and moisture vapor barrier (i.e. lower moisture vapor transmission rate or "MVTR"), and can benefit the finished package greatly. This cross-linking can significantly impede the recyclability of this finished film due to the strong cross-linked matrix. One can also see in FIG. 1 that when a blend of EVOH and PVOH are cross-linked, the mass losses at low temperatures can even be more severe, with losses up to 21.8 wt % at 200° C. Thus the cross-linked samples can be much more difficult to recycle without degradation than uncrosslinked materials.

Plastic recycling by the embodiments of this invention includes recycling of waste packaging, particularly polyolefin-containing waste that includes polar polymers like PVOH and EVOH. Other embodiments of the invention relate to optimum waste management strategies considering the full spectrum of available options. The main area includes recycling PVOH/EVOH-containing plastic materials by reprocessing of these plastic materials into new products.

The embodiments herein relate to a polyolefin-containing film comprising a solidified form of a melt, the melt comprising at least 1 weight percent shredded recycled crosslinked vinyl-alcohol polymer coated polyolefin material and an amount of a compatibilizing agent and/or an un-crosslinking agent configured to un-crosslink the crosslinked vinyl-alcohol in the melt, the polyolefin-containing film having an average dimple count of less than about 50 dimples/4 in$^2$, and method of manufacturing the same.

Preferably, the polyolefin-containing film has an average dimple count of 30 dimples/4 in$^2$. The melt could contain at least 5 weight percent of the shredded recycled crosslinked vinyl-alcohol polymer coated polyolefin material. The shredded recycled crosslinked vinyl-alcohol polymer coated polyolefin material could be made from ground up flakes. The shredded recycled crosslinked vinyl-alcohol polymer coated polyolefin material could comprise water and/or the compatibilizing agent.

In one embodiment, the polyolefin-containing film of claim 1, wherein the melt comprises 1 to 10 parts by weight of the compatibilizing agent and/or 1 to 10 parts by weight of the un-crosslinking agent for 100 parts of the shredded recycled crosslinked vinyl-alcohol polymer coated polyolefin material.

Preferably, the compatibilizing agents include polyethylene grafted or copolymers that contain ester or acetate groups.

Preferably, the un-crosslinking agents include water. One can also contemplate the use of glycerol as an un-crosslinking agent, though at significantly higher cost than water which is shown effective in this invention.

Preferably, the vinyl-alcohol coated polymer could comprise PVOH, EVOH, or blends thereof. The EVOH could contain 10% ethylene or less.

Another embodiment relates to a laminate film comprising the polyolefin-containing film disclosed above and a metal-containing layer.

Yet another embodiment relates to a method of manufacturing a polyolefin-containing film comprising forming a melt comprising at least 1 weight percent shredded recycled crosslinked vinyl-alcohol polymer coated polyolefin material and an amount of a compatibilizing agent and/or an un-crosslinking agent configured to un-crosslink the crosslinked vinyl-alcohol in the melt and solidifying the melt to form the polyolefin-containing film that has an average dimple count of less than about 50 dimples/4 in$^2$.

The method could further comprise extruding the melt in an extruder. In one embodiment, the un-crosslinking agent comprises water, and the un-crosslinking agent un-crosslinks the crosslinked vinyl-alcohol polymer in situ in the extruder.

In yet another embodiment, the shredded recycled crosslinked vinyl-alcohol polymer coated polyolefin material are fed to the extruder and the compatibilizing agent and/or the un-crosslinking agent is added to the shredded recycled crosslinked vinyl-alcohol polymer coated polyolefin material prior to introduction of the shredded recycled crosslinked vinyl-alcohol polymer coated polyolefin material into the extruder or within the extruder.

The specific pelletizing/extrusion processes enabling this recycle content is accomplished by having a grinding system attached to the infeed of the extruder, such that the film is ground into pieces less than 5 cm in aspect ratio, and preferably between 1-2 cm. During this process water is sprayed into the grinding chamber in an amount between 1-8 wt %, preferably with 4-5 wt %, of the ground film, to coat the individual exposed layers of the film pieces created by the grinding process. It is important to try and maximize the water contact to the individual pieces of film, and thus placement of the water injection and size of the film pieces are important. The grinding operation is also important as folded-over pieces, which can be common in very small grindings, provide poor surface area for the water to intimately contact. It may also be useful to contemplate agitators or mixers used with the process of spraying water with the ground film, in order to help ensure the ground pieces of film have been wetted with water.

Polyolefin films such as biaxially oriented polypropylene (BOPP) can be coated with PVOH, EVOH, or blends thereof, and can be crosslinked if desired. BOPP films can also be coextruded with certain extrusion-grade versions of PVOH and particularly, EVOH with high ethylene content, typically 38 wt % ethylene content or higher. In the case of vinyl-alcohol polymers coated onto BOPP substrates, such application may be done "in-line" or "off-line"; these terms refer to either coating the vinyl-alcohol polymer as: 1) part of the BOPP process wherein the coating is typically applied to the film made in a sequential orientation machine between the machine direction orienter and the transverse direction orienter ("in-line"); or 2) applying the coating to an already-formed BOPP film in a separate process such as a separate stand-alone coating machine ("off-line").

A suitable embodiment of producing the vinyl-alcohol polymer-coated laminate polyolefin film is based on biaxially oriented polypropylene films. Said BOPP film is usually a multi-layer coextruded film, preferably made with a coextruded layer of a suitable tie-resin such as maleic anhydride-grafted propylene homopolymer or copolymer. This tie-resin layer has good compatibility with the coextruded BOPP core layer or base layer as well as good compatibility with the polar vinyl-alcohol polymer coating. In this embodiment of the invention, the laminate film can comprise: an isotactic polypropylene resin core layer (which may be without any adhesion promoting resin blended therein); an adhesion-promoting resin blend layer (aka tie-layer) coextruded upon one side of said core layer, comprising preferably an anhydride-grafted polypropylene or ethylene-propylene copolymer or an ethylene-acrylic ester-maleic anhydride copolymer, optionally blended with a propylene homopolymer or propylene-ethylene copolymer resin at a ratio of 0-95 wt % of the propylene homopolymer or propylene-ethylene copolymer resin (i.e. 100-5 wt % adhesion-promoting tie resin), preferably at a blend ratio of 90-60 wt % of the propylene homopolymer or propylene-ethylene copolymer resin, and more preferably at 80-70 wt % of the propylene homopolymer or propylene-ethylene copolymer resin (i.e. 20-30 wt % of the adhesion promoting resin in the blend); an optional heat sealable layer or a non-heat sealable winding layer coextruded onto the side opposite the tie-layer of said core layer; and a crosslinked EVOH/PVOH blend layer in-line coated on the side of said tie-layer which is opposite that of the core layer. This in-line coated layer also provides a suitable surface for vapor deposition of metal (aka metal adhesion layer).

The adhesion between the polar EVOH/PVOH coating and the non-polar polyolefin substrate layer depends upon their chemistry and physics. Chemically, it depends upon the interaction forces between them. Physically, it depends upon the stiffness and thickness of the layers. To facilitate adequate bonding between polar and non-polar materials, a tie-layer or adhesion promoter is usually required. Such tie-layers usually incorporate some degree of polar functionality to promote compatibility with the polar material of interest, yet not too high a degree of polar functionality in order to maintain compatibility with the non-polar material of interest. This can be especially important during coextrusion and coating processes and subsequent orientation of such cast multilayer substrates into oriented films. Without using such a tie-layer between for example, the EVOH/PVOH blend coating and polypropylene in an in-line coated film process, the EVOH/PVOH blend layer can fail to wet-out adequately and coalesce into a contiguous coating on the polypropylene basefilm during coating. Also, the dried EVOH/crosslinked PVOH can delaminate and wrap downstream rollers after orientation in the tenter process. Using a tie-layer to promote adhesion between the EVOH/PVOH layer and polypropylene avoids these problems.

One such class of tie-layer materials use polyolefins such as polyethylene and polypropylene grafted with maleic anhydride to produce polar functionalized polymers and have proven to be effective as a tie-layer or adhesion promoter for bonding non-polar polypropylene or polyethylene to a polar polymers such as EVOH, PVOH, blends thereof, and other polar polymers. The amount of grafting can control the effectiveness of the tie-layer, i.e. the higher the amount of anhydride grafting, the more effective it can be as an adhesion promoter for bonding polar materials to non-polar materials. In addition, most anhydride-grafted polyolefins contain rubbers as a tie-layer to enhance the adhesion between polar and non-polar materials. This rubber component of the tie-layer helps improve adhesion by being relatively softer and more flexible and thus conform better to the more crystalline polar (e.g. EVOH/PVOH) and non-polar (e.g. polypropylene) materials of interest. However, if the rubber content is too high or too much tie-layer resin is used, the resultant film produced is often very hazy and aesthetically less pleasing.

However, the amount of grafting is limited as such anhydrides can cause degradation of the polyolefin chain it is grafted to. This can usually be seen in a large increase in melt flow rates after grafting. For example, many anhydride-grafted polypropylenes are limited to 0.5 wt % anhydride (typically less than 1 wt % anhydride) due to this issue with polymer degradation. At 1 wt % or more anhydride, the polypropylene melt flow rate increases greatly, melt strength and molecular weight is decreased significantly, to the point where it is unsuitable for oriented film production or casting. In addition, there can be limitations imposed upon the amount of anhydride grafting for food packaging applications due to FDA regulations.

Popular maleic anhydride-grafted propylene homopolymers or copolymers are those produced by Mitsui Chemicals under the Admer® tradename such as grade QF500A with 0.12-0.15 wt % maleic anhydride, 3.0 g/10 min melt flow rate at 230° C., and 143° C. Vicat softening point. Other suitable maleic anhydride-grafted adhesion promoter resin grades are those such as DuPont Bynel® 3861 anhydride-grafted polypropylene, Mitsui Admer® QF551A, anhydride-grafted ethylene-propylene copolymer, and Admer® AT777A, anhydride-grafted polypropylene and EP copolymer without rubber contents.

Besides anhydride-grafted polyolefins, ethylene polar terpolymers (e.g. ethylene-acrylic ester-maleic anhydride copolymers) such as Arkema's Lotader® resins have been used as a tie-layer between polyethylene and polar resins like EVOH, PVOH, and blends thereof. However, according to the resin producer Arkema (and formerly AtoFina) from references presented at TAPPI Conference May 2003 "Adhesive Properties of Ethylene-Acrylic Ester-Maleic Anhydride Terpolymers in Extrusion Coating/Lamination" and product literature presentation materials May 2005 "Lotader: Ultra Versatile Adhesives for Extrusion Coating and Extrusion Lamination Technologies", the low co-monomer content (e.g. 10 wt % or less butyl acrylate or methyl acrylate co-monomer) versions of these ethylene polar terpolymers have shown poor effectiveness as a tie-layer for polypropylene and polar resins and thus, have not been used in oriented polypropylene film applications. Only high co-monomer content (e.g. 16-25 wt % butyl acrylate or methyl acrylate co-monomer) ethylene polar terpolymers can be effectively used to bond to polypropylene substrates. Unfortunately, the drawbacks of such high co-monomer content ethylene polar terpolymers is that the melting point is much lower than the low content co-monomer versions (77-90° C. vs. 105-107° C. respectively), the material is much softer (modulus 20-60 MPa vs. 110-120 MPa respectively) and stickier (Vicat softening point 40-55° C. vs. 65-80° C. respectively), and consequently, in film extrusion and orientation, the use of these high co-monomer content ethylene polar terpolymer materials can result in severe processing problems such as resin pellet bridging in the resin feed system of the extruder throat, sticking and subsequent film breakage of the film to the cast roll, MDO rolls, and other downstream processes which involve heat for orientation and heat-setting. Thus, the Lotader materials are not effective for polypropylene film manufacturing because: 1) if low co-monomer content ethylene polar terpolymer is used, poor adhesion is found to the polypropylene; 2) if high co-monomer content ethylene polar terpolymer is used, poor processability results from the extrusion, casting, and orientation processes. To make the Lotader materials more suitable for polypropylene film manufacturing processes, blending the Lotader tie-resin as a minority component with propylene homopolymer or propylene copolymer is preferred.

The chemistry and composition of the Lotader ethylene polar terpolymers are different from anhydride-grafted polyolefins. The former ones are made through polymerization with 3 co-monomers (i.e. ethylene, butyl or methyl acrylate, and maleic anhydride or glycidil methacrylate) and the polar functional groups are incorporated as part of the polymer chain's backbone. In contrast, the anhydride-grafted polyolefins are made by grafting the functional anhydride groups onto the side chains of a polymer via radical reactions. The degree in which anhydride groups can be grafted onto polypropylene or ethylene-propylene copolymers is limited because this radical reaction used in the grafting process results in a competing reaction: chain scission of the polypropylene backbone at the tertiary carbons. Normally, high molecular weight anydride-grafted polypropylene or ethylene-propylene copolymer contains less than 1 wt % of the anydride groups for this reason. Popular anhydride-grafted resins such as Mitsui's Admer® product line (grades QF500A and QF551A) and DuPont's Bynel® product line are of this type. Some low molecular weight anydride-grafted polypropylenes available from Crompton contain more than 1 wt % of anhydride functional groups, however, the reason they are low molecular weight is due to the degradation caused by the relatively high amount of anhydride grafting. Such low molecular weight/high anhydride content grafted materials have been used as coupling agents; however, they are not suitable for use as a tie-layer in oriented film applications.

Blending ethylene-propylene copolymer or propylene homopolymer and low or high co-monomer content ethylene polar terpolymers such as ethylene-butyl acrylate-maleic anhydride copolymer, ethylene-methyl acrylate-maleic anhydride copolymer, or ethylene-methyl acrylate-glycidil methacrylate copolymer, or blends thereof, can make for an effective tie-layer formulation as an alternative to anhydride-grafted polyolefins. This blend is very effective as a tie-layer formulation for promoting adhesion between polypropylene substrates and polar materials such as EVOH, PVOH and blends thereof. The blends are a surprising advantage over using low co-monomer content ethylene polar terpolymers alone which have been shown not to be an effective tie-layer for bonding polypropylene and EVOH. The blends are a surprising advantage over using high co-monomer content ethylene polar terpolymers alone in that not only are the adhesion-promoting properties maintained, but also the processability of such a tie-layer blend in coextrusion and biaxially oriented film processes is considerably more efficient and stable.

Suitable ethylene polar terpolymers for this tie-layer blend are such as those available from Arkema: Lotader 3210 or 4210 (an ethylene-butyl acrylate-maleic anhydride terpolymer) or Lotader AX8900 (an ethylene-methyl acrylate-glycidal methacrylate terpolymer). Lotader 3210 is a copolymer of about 91 wt % ethylene, 6 wt % butyl acrylate, and 3 wt % maleic anhydride; Lotader 4210 is about 90 wt % ethylene, 7 wt % butyl acrylate, and 3.6 wt % maleic anydride. It should be noted that Lotader 3210 and 4210 are not grafted maleic anhydride polymers like Mitsui's Admer QF551A or QF500A. Lotader AX8900 is a copolymer of about 67 wt % ethylene, 25 wt % methyl acrylate, and 8 wt % glycidal methacrylate. Preferably, the amount of the butyl or methyl acrylate co-monomer in the ethylene polar terpolymer should be about 25 wt % or less, more preferably 5-16 wt % of the terpolymer. For ease of processability in extrusion and orientation processes, the amount of a butyl or methyl acrylate co-monomer is preferably 1-10 wt % of the terpolymer, more preferably 5-8 wt % of the terpolymer. Of these low co-monomer content ethylene polar terpolymers, Lotader 4210 is particularly preferred for use in this mixed resin tie-layer blend for its combination of adhesion promoting properties and processability in extrusion.

Tie-layer blends comprising maleic anhydride-grafted propylene polymer-based resins or ethylene-acrylic acid-maleic anhydride terpolymers with propylene homopolymers or copolymers can be used wherein the amount of adhesion-promoting tie resin is preferentially in the range of 5-50 wt %, more preferably 10-40 wt %, and even more preferably 20-30 wt % of the tie-layer blend. In one embodiment, this tie-layer blended resin can comprise the core layer upon which the EVOH/PVOH coating is applied; in another embodiment, this tie-layer blend formulation may be coextruded as a discrete layer on one side of a propylene polymer-based core layer substantially free of said tie resin blends. In this latter embodiment, the thickness of the discrete coextruded tie-layer blend after biaxial orientation is preferably 4.0 G (1.0 μm). Additionally, an amount of inorganic antiblock may also comprise this tie-layer blend, optionally added up to 1000 ppm to this resin layer to aid in downstream film-handling and processing. Preferably 300-500 ppm of antiblock may be added. Suitable antiblock agents comprise those such as inorganic silicas, sodium calcium aluminosilicates, crosslinked silicone polymers such as polymethylsilsesquioxane, and polymethylmethacrylate spheres. Typical useful particle sizes of these antiblocks range from 1-12 um, preferably in the range of 2-6 um.

The blended resin tie-layer can be optionally surface-treated with either a corona-discharge method, flame treatment, atmospheric plasma, or corona discharge in a controlled atmosphere of nitrogen, carbon dioxide, or a mixture thereof prior to in-line coating with the EVOH/PVOH solution but after machine direction orientation. Preferred is a simple treatment using corona discharge in air. This "pretreatment" prior to in-line coating is useful in helping to further wet-out of the coating onto the tie-resin layer. It can then be coated with a layer of the EVOH/PVOH coating formulation.

The polypropylene resin used in the core layer is preferably a crystalline polypropylene of a specific isotactic content and can be uniaxially or biaxially oriented. Crystalline polypropylenes are generally described as having an isotactic content of about 90% or greater as measured by $C^{13}$ NMR. Suitable examples of crystalline polypropylenes for this invention are Total Petrochemicals 3271 and ExxonMobil PP4772. These resins also have melt flow rates of about 0.5 to 5 g/10 min at 230°, a melting point of about 163-167° C., a crystallization temperature of about 108-126° C., a heat of fusion of about 86-110 J/g, a heat of crystallization of about 105-111 J/g, and a density of about 0.90-0.91. The core resin layer is typically 5 μm to 50 μm in thickness after biaxial orientation, preferably between 10 μm and 25 μm, and more preferably between 12.5 μm and 17.5 μm in thickness. Additionally, a small amount of inorganic antiblocking agent may be optionally added up to 1000 ppm to this resin layer in the case where the core layer also acts as the tie-layer blend for coating. Preferably 300-500 ppm of antiblock may be added. Suitable antiblock agents comprise those such as inorganic silicas, sodium calcium aluminosilicates, crosslinked silicone polymers such as polymethylsilsesquioxane, and polymethylmethacrylate spheres. Typical useful particle sizes of these antiblocks range from 1-12 um, preferably in the range of 2-6 um.

A heat-sealable layer or non-heat sealable layer may be coextruded with the core layer opposite the tie-resin blend layer having a thickness after biaxial orientation between 0.8 and 20 G (0.2 and 5 µm), preferably between 2.4 and 12 G (0.6 and 3 µm), and more preferably between 3.2 and 6 G (0.8 and 1.5 µm). The heat-sealable layer may contain an anti-blocking agent and/or slip additives for good machinability and a low coefficient of friction in about 0.05-0.5% by weight of the heat-sealable layer. The heat-sealable layer will be a copolymer of propylene, either ethylene-propylene or butylene-propylene, and preferably comprise a ternary ethylene-propylene-butene copolymer. Suitable heat-sealable terpolymer resins can be those produced by Sumitomo such as grades SPX78H8 or SPX79F1.

If the BOPP film comprises a non-heat sealable winding layer, this layer can comprise a crystalline polypropylene with anti-blocking and/or slip additives or a matte layer of a block copolymer blend of polypropylene and one or more other polymers whose surface is roughened during the film formation step so as to produce a matte finish on the winding layer. Preferably, the surface of the winding layer is discharge-treated to provide a functional surface for lamination or coating with adhesives and/or inks.

The coextrusion process includes a three- or four-layered compositing die. In the embodiment of a 3-layer coextruded substrate, the polypropylene core layer is sandwiched between the blended resin tie-layer and the heat sealable or winding layer. The resin layers are typically melt extruded at 220-260° C. The multilayer laminate film is cast onto a cooling drum whose surface temperature is controlled between 30° C. and 90° C. to solidify the non-oriented laminate film. The non-oriented laminate film is stretched in the longitudinal or machine direction at about 95 to 165° C. at a stretching ratio of about 4 to about 5 times the original length and the resulting stretched film is cooled to about 15° C. to 50° C. to obtain a uniaxially oriented laminate film. The uniaxially oriented laminate film is introduced into a tenter and preliminarily heated between 130° C. and 180° C., and stretched in the transverse direction at a stretching ratio of about 8 to about 10 times the original width and then heat-set or annealed to reduce internal stresses due to the orientation and minimize shrinkage and give a relatively stable biaxially oriented film. The biaxially oriented film has a total thickness between 24 and 160 G (6 and 40 µm), preferably between 40 and 80 G (10 and 20 µm), and most preferably between 50 and 70 G (12.5 and 17.5 µm).

The EVOH/PVOH polar polymer coating formulation may be applied to the blended resin tie-layer via in-line coating process onto the blended resin tie-layer side of the laminate film structure formed by coextrusion, dried, and oriented. The aqueous coatings can be applied either "in-line" or "out-of-line," but preferably in-line to reduce manufacturing cost. In an "in-line" coating process, the coating station is located after the machine direction stretching process of a monoaxial or biaxial orientation process and dried in a drying oven or using the tenter oven preheating zones as a dryer. In the case of biaxial orientation, the coated monoaxially stretched film is then stretched in the transverse direction. An advantage of this process is that the orientation and coating of the invention can be essentially done in one processing step. It can be beneficial to in-line discharge treat the monoaxial substrate prior to the coating station in order that the aqueous solution adequately "wets" the substrate surface for consistent coating weight, drying, and appearance, but not always necessary with the tie-layer resin formulation. In an "out-of-line" coating process, the finished monoaxial or biaxial film is wound up in a roll form, and is mounted on a separate coating machine. Again, the monoaxial or biaxial film substrate can have the desired surface for coating with the polar polymer solution discharge-treated in order to help ensure that the solution adequately wets the surface. This separate coating line will then apply the solution, dry it, and rewind the finished product. The preferred method to coat in this embodiment is via the in-line coating process.

The in-line coating layer is a 5-20 wt % non-volatile solids (NVS) aqueous coating (prior to drying), comprising a blend of EVOH and PVOH. The EVOH component is about 3-10 wt % NVS of the total solution, preferably 3.5-8.5 wt % NVS. The EVOH is a water soluble grade, preferably 5-20 mol % ethylene with 92.0-99.5 mol-% degree of hydrolysis, and more preferably 5-10 mol % ethylene with 97.5-99.0 mol-% degree of hydrolysis (saponification). The PVOH component is also water soluble, preferably a partially or fully hydrolyzed grade of about 88.0-98.4 mol-% degree of hydrolysis respectively, and about 4.00+/−0.50 cP solution viscosity at 4 wt % solids. The PVOH component used in the total solution is about 0.2-12.0 wt % NVS. The NVS amount of EVOH to PVOH ranges from 25-90 wt % EVOH (75-10 wt % PVOH). Also included in this in-line coating formulation is an amount of glyoxal (aka ethanedial) crosslinking agent from 0.25-2.5 wt % NVS of the coating, preferably 0.3-1.75 wt % NVS. An optional amount of defoamer may also be added from 0.05-0.15 wt % of the total coating, preferably 0.06-0.10 wt %. (The amount of defoamer used must be watched, as too much can cause de-wetting of the coating from the substrate; too little could be ineffective as a defoamer.) Optional anti-microbial agents may be added to the coating solution as well in order to inhibit bacterial or mold growth to enable long-term storage and shelf-stability prior to use.

The coating formulation is preferably 5-20 wt % solids in aqueous solution, more preferably 10-18 wt % solids and even more preferably 12-15 wt % solids. After drying and transverse orientation, the dried coating thickness is preferably 0.2-2.0 G (0.05-0.5 µm), and more preferably 0.5-1.0 G (0.125-0.25 µm).

As mentioned, the EVOH component of the in-line coating is a water soluble grade, preferably of 5-20 mol % ethylene content and of 92.0-99.5 mol-% degree of hydrolysis. Suitable EVOH types can be those produced and distributed by Kuraray America Inc. under the tradename Exceval® which are medium hydrolyzed grade RS1717 (viscosity 23.0-30.0 mPa-sec of a 4 wt % solids aqueous solution at 20° C. determined by Brookfield synchronized rotary-type viscometer; 92.0-94.0 mol-% degree of hydrolysis; 0.4 wt % maximum ash content calculated as $N_{a2}O$; and 5.0 wt % maximum volatile content after 3 hours drying at 105° C. with methanol content less than 3.0 wt %); fully hydrolyzed grade RS2117 (viscosity 23.0-30.0 mPa-sec of a 4 wt % solids aqueous solution at 20° C. determined by Brookfield synchronized rotary-type viscometer; 97.5.0-99.0 mol-% degree of hydrolysis; 0.4 wt % maximum ash content calculated as $N_{a2}O$; and 5.0 wt % maximum volatile content after 3 hours drying at 105° C. with methanol content less than 3.0 wt %); and super hydrolyzed grade HR-3010 (viscosity 12.0-16.0 mPa-sec of a 4 wt % solids aqueous solution at 20° C. determined by Brookfield synchronized rotary-type viscometer; 99.0-99.4 mol-% degree of hydrolysis; 0.4 wt % maximum ash content calculated as $N_{a2}O$; and 5.0% wt maximum volatile content after 3 hours drying at 105° C. with methanol content less than 3.0 wt %). Of these commercially available grades, the RS2117 grade is particularly preferred which has a molecular weight of Mw of about 130,000 g/mol, Mn of about 53,000 g/mol, Mw/Mn of about 2.4-2.5 via GPC measurement.

Suitable grades of water soluble PVOH can be obtained from Sekisui Chemicals Inc. such as Selvol® fully hydrolyzed PVOH grades 103 (98.40+/−0.40 mol-% hydrolysis, 4 wt % solids solution viscosity 4.00+/−0.50 cP, total volatiles 5.00 wt % maximum, methanol maximum 0.90 wt %, ash maximum 1.20 wt %, and 4 wt % solution pH 6.00+/−1.00); grade 125 (99.65+/−0.35 mol-% hydrolysis, 4 wt % solids solution viscosity 30.00+/−2.00 cP, total volatiles 5.00 wt % maximum, methanol maximum 0.90 wt %, ash maximum 1.20 wt %, and 4 wt % solution pH 6.00+/−1.00); grade 125 (99.65+/−0.35 mol-% hydrolysis, 4 wt % solids solution viscosity 30.00+/−2.00 cP, total volatiles 5.00 wt % maximum, methanol maximum 0.90 wt %, ash maximum 1.20 wt %, and 4 wt % solution pH 6.50+/−1.00); grade 305 (98.40+/−0.40 mol-% hydrolysis, 4 wt % solids solution viscosity 5.00+/−0.50 cP, total volatiles 5.00 wt % maximum, methanol maximum 0.90 wt %, ash maximum 1.20 wt %, and 4 wt % solution pH 6.00+/−1.00); and grade 825 (98.40+/−0.40 mol-% hydrolysis, 4 wt % solids solution viscosity 30.00+/−2.00 cP, total volatiles 5.00 wt % maximum, methanol maximum 0.90 wt %, ash maximum 1.20 wt %, and 4 wt % solution pH 6.00+/−1.00).

Also very suitable are Selvol® partially hydrolyzed grades 203 (88.00+/−1.00 mol-% hydrolysis, 4 wt % solids solution viscosity 4.00+/−0.50 cP, total volatiles 5.00 wt % maximum, methanol maximum 0.90 wt %, ash maximum 0.90 wt %, and 4 wt % solution pH 5.50+/−1.00); grade 523 (88.00+/−1.00 mol-% hydrolysis, 4 wt % solids solution viscosity 25.00+/−2.00 cP, total volatiles 5.00 wt % maximum, methanol maximum 0.90 wt %, ash maximum 0.50 wt %, and 4 wt % solution pH 5.50+/−1.00); and grade 502 (88.00+/−1.00 mol-% hydrolysis, 4 wt % solids solution viscosity 3.35+/−0.35 cP). Particularly preferred are the lower viscosity grades 103 fully hydrolyzed PVOH powder, and grades 502 granular powder and 203 partially hydrolyzed PVOH, of which the latter can be commercially available as a 23 wt % non-volatile solids aqueous solution.

Optionally, an amount of defoamer can be added to help control foaming during the coating application. A suitable defoamer can be obtained from Air Products Inc as grade Surfynol® 420 nonionic surfactant ethylene oxide-based defoaming agent with ethylene oxide content 1.3 mol % (20 wt %), specific gravity 0.943 at 25° C., viscosity <250 cps at 20° C., hydrophile-lipophile balance of 4, pH at 1% aqueous solution of 6-8, and volatile organic content of 28 wt %.

Figure 3:
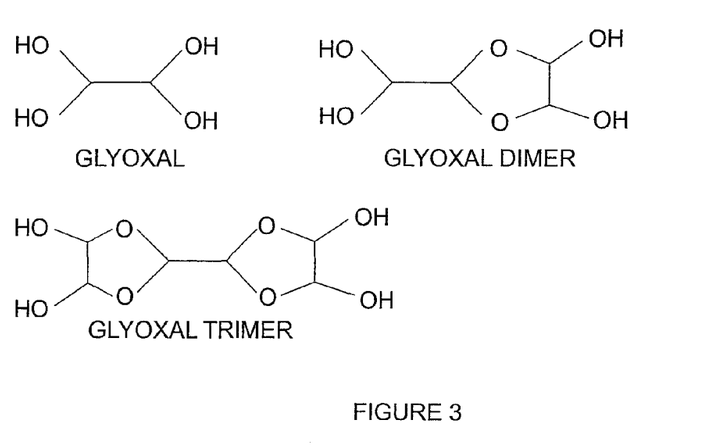
FIG. 3: Glyoxal and hydrate oligomers.

PVOH and EVOH polymers can be crosslinked using glyoxal crosslinking agents of the general structure OCH—CHO; or, in a shorthand form: $B(OH)_4^-$. Crosslinking these vinyl-alcohol polymers can be of value as it can improve performance properties. Crosslinking improves resistance to moisture, reducing the polar polymer layer's swelling, and increasing its Tg. When metallizing said vinyl-alcohol polar polymer coated layer, metal adhesion of the vapor-deposited metal is often strengthed. The glyoxal crosslinker is generally supplied as a 40 wt % aqueous solution, and can also form hydrates; these hydrates, in turn, can form a series of oligomers via condensation reactions (FIG. 3). Suitable crosslinker can be obtained from Emerald Performance Materials such as their grade Freechem® 40DL glyoxal (aka ethanedial) at ca. 40 wt % glyoxal non-volatile solids aqueous solution, less than 0.8 wt % residual acid, pH of 3.0, and specific gravity 1.270.

Figure 4:
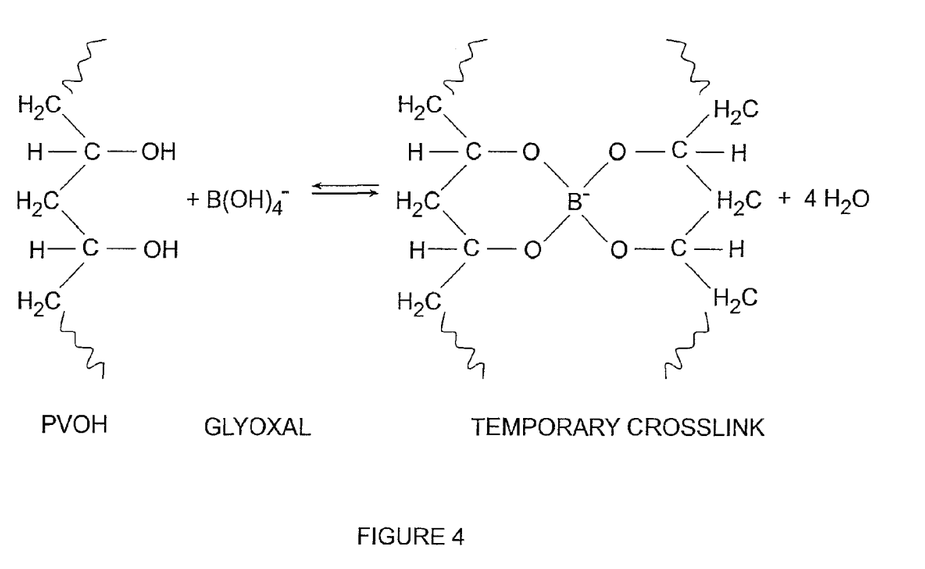
FIG. 4: Reversible reaction crosslinked PVOH with water extrusion.

Without being bound by any theory, the reaction of PVOH or EVOH (or blends thereof) with glyoxal forms a crosslinked structure (FIG. 4). However, this crosslinking reaction could be reversible with water addition and heat such as supplied in an polymer extrusion system. Thus, the crosslinked vinyl-alcohol coating could be "un-crosslinked" with water addition and heat and thus, the polar polymer constituents could be more easily dispersed throughout the polyolefin matrix.

In addition, it is believed that when the water contacts the PVOH or EVOH polymers, they are allowed to separate from each other, as the water will be attracted to any un-crosslinked sites. By dispersing these PVOH or EVOH polymer matrices, and melting the wet, coated ground film in a vented extrusion line (e.g. a vented single-screw extruder or a vented twin-screw extruder may be used; however, it is important to use low shear rate conditions), it is believed that two scenarios occur: 1) low molecular weight species can be exhausted through subsequent vent zones of the extruder; and/or 2) the PVOH or EVOH molecules disperse into the overall polymer. More dispersion will help reduce further cross-linking between the PVOH or EVOH molecules, as the immediate concentration is less, thus providing a better resistance to degradation. Moreover, it can be contemplated to also add a compatibilizing agent, such as a polar tie resin like maleic-anhydride modified polyolefin or polar copolymer to help disperse the polyvinyl or ethylene vinyl-alcohol constituents in the polyolefin matrix. Such a tie resin can be added or blended in with the shredded, ground, wettened coated film.

Once the ground, vinyl-alcohol-coated polyolefin film is contacted with water the material can be fed through a single screw extruder that has a venting zone. Twin-screw extrusion could also be used and this type of extruder (such models as manufactured by Berstorff Corp., Leistritz Corp., or Werner & Pfleiderer Corp. and can be counter-rotating or co-rotating) can be configured for improved mixing and blending of the polymer constituents, so long as low shear rate conditions are used—if shear rates are too high, undesirable degradation of the polar vinyl-alcohol polymers could occur. An extended venting zone is preferred as it provides more surface area, and thus more opportunity, for the high water content from the wet film scraps and any low molecular weight species to be exhausted. Some commercial examples of an extended venting zone extruder are available from Next Generation Recyclingmaschinen GmbH (NGR) of Feldkrichen, Austria; or Erema Recycling GmbH of Ansfelden, Austria. Another type is that produced by Gneuss, Inc. as its MRS® Multi-Rotation System extruder model which incorporates a unique "screw drum" design. In this design, the screw drum comprises 8 smaller extruder barrels and screws parallel to the main extruder barrelaxis. These "satellite" screws rotate in the opposite direction from the main extruder "planetary" screw while they rotate around the main planet screw axis. This design increases significantly the surface exchange area of the polymer melt which is significantly greater than a conventional single screw or twin-screw extruder design; and since the satellite extruder barrels are approximately 30% open, this provides significantly greater surface area that can be vented for removal of volatiles.

In particular, NGR's S-GRAN®, A-GRAN®, X-GRAN®, and E-GRAN® series of recycling machines is preferred, and more preferably, the S-GRAN® system which is of an intermediate screw-size and output rate and comprises a single screw design with extended venting section. This system is comprised of several processing steps of: A) slow-running cutting blades to shred or grind plastic waste or scrap material; B) a feed screw to transport said shredded material to the extruder; and C) a vented extruder which allows degassing of the material as it undergoes extrusion within said extruder. The preference for the NGR system is that all these processes are combined within a single machine. The slow-running cutting process shreds the coated film material without causing severe degradation of the coating; it is in this section that water can be sprayed into the cutting chamber to adequately wet the shredded or ground material. Alternatively, water can be injected into the extruder through a side additive feeder or dosing device, into the extruder's feed hopper or feed section of the extruder, or between the shredding/grinding section and the extruder intake.

In the shredding or grinding process, preferably the vinyl-alcohol polymer-coated film is ground into pieces less than 5 cm in aspect ratio, and more preferably between 1-2 cm. The NGR grinder (or cutter) hopper volume was typically 0.75-1.5 m$^3$ and preferably, 0.75 m$^3$. During this process, water is sprayed into the grinding chamber in an amount between 1-10 wt %, and preferably with 4-6 wt %, of the ground film, to coat the individual exposed layers of the film pieces created by the grinding process. A critical feature of the inventive method is to maximize the water contact to the individual pieces of film, and thus placement of the water injection and size of the film pieces are important. The grinding operation is also important as folded-over pieces, which can be common in very small grindings, provide poor surface area for the water to intimately contact.

An adequately designed and sized vacuum system is recommended to efficiently remove the water and low molecular weight species from the extruder. Preferably, a vacuum of 20-100 mbar is applied, preferably 30-85 mbar. For both the NGR and Erema extruder designs, a low-shear screw, and the lowest extrusion temperatures permitted for good flow are desired as this helps reduce any subsequent cross-linking or degradation of the PVOH or EVOH molecules. Extrusion temperatures should be in the range of 300-450° F. (149-232° C.), and preferably about 400-430° F. (ca. 204-221° C.). In particular, an extended venting section built into the screw design allows a larger surface area for the improved evacuation of said water and low molecular weight species from the melted material. Typical extruder screw diameter for the NGR S-GRAN° system was from 65-125 mm; preferably, 85 mm single screw diameter was used. L/D (length to diameter) ratio of the screw was 37 for the preferred vented screw design (in comparison, non-vented screw L/D was 21) and preferably designed generally for processing polyolefin materials. The extruder size range provided typical output rates of the extruded pellets of about 140-750 kg/hr; at 85 mm for the screw size, typical output ranged 250-330 kg/hr.

Another important part of the inventive method is adequate filtration of the melt stream prior to pelletization to remove any degraded materials or contaminants. This can be done by any method well known in the art such as filter screens, filter packs, filter trees, continuous filter changers. Preferably, screen or filter packs of 100-400 mesh are preferred, more preferably 250-325 mesh. Particularly preferred, is the use of back-flush filtration systems or continuous screen changer systems which can self-clean or index fresh filter/screen material into the melt stream without incurring significant downtime to change filter media in the extrusion system. One particularly preferred continuous filtration system is that made by Gneuss, Inc. as model RSF® Rotary Filtration System. This system is comprised of a rotary filter disk, back-flushing system, and control system that sense polymer pressure increases. As the polymer melt flows into the rotary disk and captures contaminants, the differential pressure before and after the filter disk increases; the control system reacts to this pressure increase and indexes the rotary filter disk by 1-2 angular degrees. This removes the contaminated screen area out of the melt stream and exposes fresh screen area into the melt stream. Meanwhile, the contaminated section of the rotary filter disk is back-flushed and the contaminated section is cleaned prior to re-entering the melt stream again. This process occurs continuously during the extrusion process and is a favorable method as it reduces productivity losses due to changing filter screens.

Optionally, compatibilizing agents can be employed to improve the miscibility of the PVOH/EVOH polar polymers with the non-polar polyolefin during the reprocessing extrusion step. Such compatibilizing agents can be introduced during the shredding/grinding process and mixed with the shredded coated film; or it can be added into the extruder via a side or additive feeder. The compatibilizing agents are often considered to be similar to "tie-resins" in which the compatibilizer is a polyolefin grafted or copolymerized with functional polar groups. This combination of polar and non-polar components helps to improve bonding or miscibility between polar and non-polar polymers. The use of compatibilizing agents or tie-resins can help disperse polar polymers such as PVOH, EVOH, or blends thereof into the polyolefin matrix within the recycled/reprocessed melt stream. Suitable compatibilizing agents can be materials like Mitsui Chemical's Admer® maleic anhydride-grafted propylene homopolymers and copolymers; and Arkema's Lotader® ethylene polar terpolymer grades mentioned previously. Other compatibilizing agents suitable for use are those such as: Kuraray Evalca's GF30 grade which is an ethylene-based polymer grafted or copolymerized with functional groups of anhydride, amide, and/or ester groups. Its density is 0.96 g/cm$^3$, melting point 111° C. via DSC endotherm peak temperature method, Vicat softening point of 96° C. via ISO 306-1987 method A—10N load, and a melt flow rate of 1.3 g/10 min at 190° C.; and Nippon Gohsei Soarus LLC Soaresin® RG500 or Soaresin® RG100 grade additive for processing of polyolefins and EVOH regrind. RG500 is a polyethylene-based material with functional groups and has a density of about 1.0 g/cm$^3$, melting point of ca. 70° C., melt flow rate at 190° C. and 2160 g weight of 6.0 g/10 min, and volatile matter of less than 0.3 wt %. RG100 is a polyethylene-based material with functional groups and has a density of about 0.97 g/cm$^3$, melting point of ca. 112° C., melt flow rate at 190° C. and 2160 g weight of 1.0 g/10 min, and volatile matter of less than 0.3 wt %.

Figure 5:
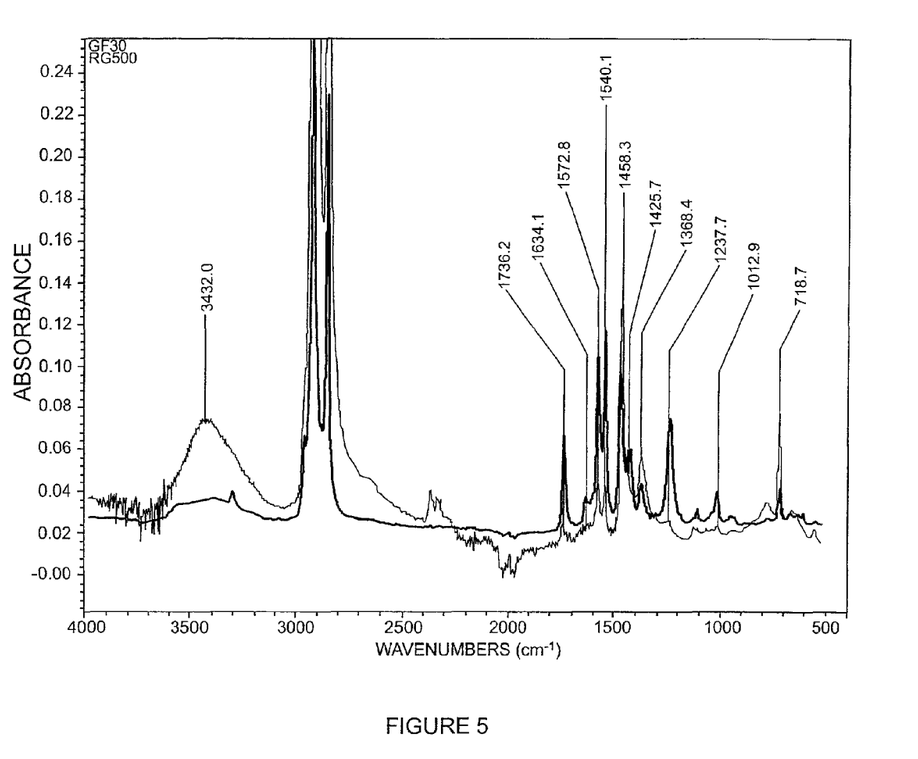
FIG. 5: FTIR of GF30 and RG500 additives

All three commercial regrind additives, GF30, RG100 and RG500 are designed for specifically processing polyolefin/EVOH regrind, and claim to reduce the formation of gels and fish eyes. Fourier Transform Infared Spectroscopy, which is shown in FIG. 5, indicates that these additives contain groups of amides, ester and acetate groups. Some alcohol groups can also be seen particularly within the GF30 material The RG500 also has a rubber phase of butadiene, which is designed to enhance compatibility with the olefin polymers.

Some or all of compatibilizing agents GF30, RG100 and RG500 and additional compatibilizing agents are disclosed in U.S. Pat. No. 4,704,423 (removing residual chlorine from Ziegler type catalyst to improve long term running and heat stability using various salts); U.S. Pat. No. 6,238,606 (using carboxylic acid, carboxylic acid ester or carboxylic acid salt for heat stability of regrind); U.S. Pat. No. 6,432,552 (heat stability of EVOH with regrinding with different salts); U.S. Pat. No. 6,753,370 (an EVOH co-polymer is stabilized with carboxylic acid-modified polyolefin and may contain various metal salts to improve stability, and specifically mentions improved regrind ability); and U.S. Pat. No. 7,683,135 (method of producing EVOH that in turn has better heat stability, and discloses >20 mol % ethylene EVOH); and all of these patents are incorporated herein in entirety by reference.

Suitable amounts of these compatibilizing agents to mix with the recycle material is about 1-10 wt % of the shredded coated material, preferably 2-6 wt %.

The material was then finished processing through the extruder and pelletized with a conventional pelletizing system for use later or could be directly fed into a die or subsequent extrusion system.

EXAMPLES

This invention will be better understood with reference to the following examples, which are intended to illustrate specific embodiments within the overall scope of the invention.

Comparative Example 1

A multi-layer coextruded biaxially oriented polypropylene (BOPP) film was made using a core layer of Total 3271 polypropylene homopolymer. A sealant layer was coextruded on one side of the core and a polypropylene grafted maleic-anhydride layer, Mitsui Chemicals America, Inc. Admer QF500A was coextruded on the opposite side. The film was then coated with an aqueous coating formulation of EVOH Exceval® RS-2117 grade of about 4.5 wt % NVS with about 11.43 wt % NVS of partially hydrolized PVOH Selvol® 502 with 0.14 wt % NVS of Surfynol® 420 defoamer and with 1.64 wt % NVS of Freechem® glyoxal 40 DL cross-linker. The coating was applied by a reverse gravure process and the subsequent coated film was dried and stretched within a tenter oven. The finished thickness of the film was 70 gauge (17.5 μm), with the core layer at 60 gauge (15 μm), sealant layer at 5 gauge (1.25 μm), tie-layer at 4 gauge (1 μm), and a coated layer between 0.7-1.3 gauge (0.18-0.33 μm).

Figure 6:
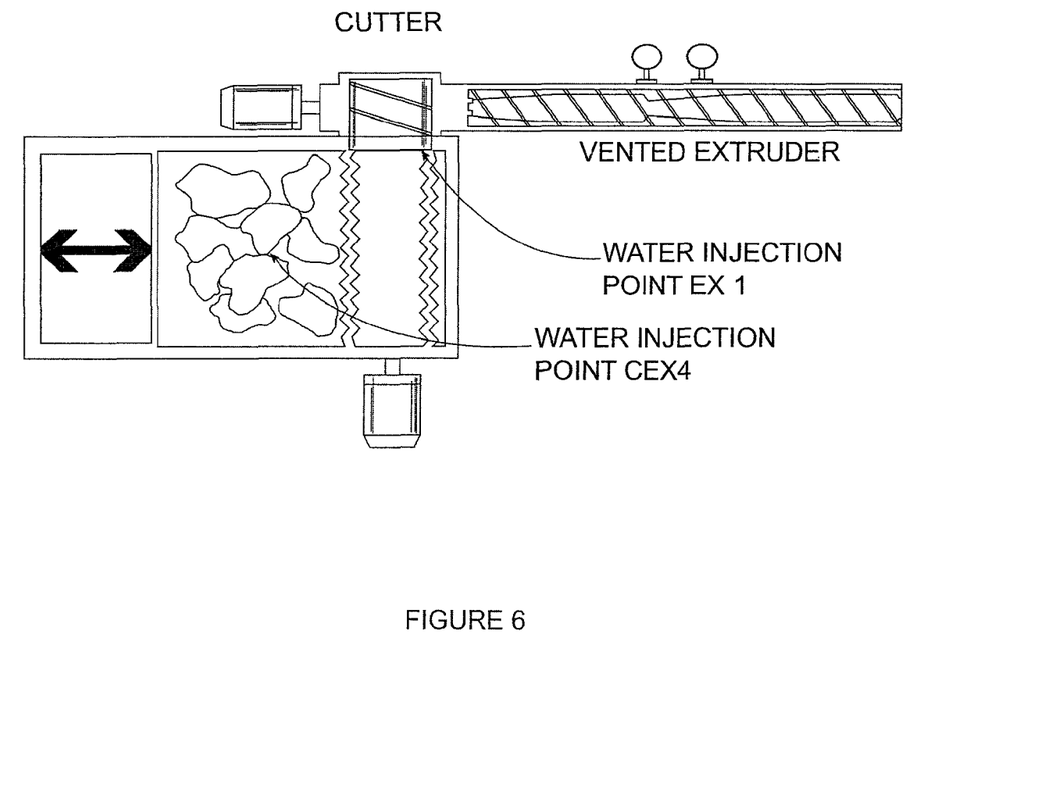
FIG. 6: NGR S:Gran Testing Setup

This finished film was cut down and was processed on a Next Generation Recyclingmaschinen GmbH (NGR) 85 mm S-GRAN® machine with an extended vent section, which is shown in FIG. 6. FIG. 6 shows bulk scrap material, which can be conveyed by belt, air or nipping rolls being fed into the grinding chamber of the NGR machine.

The film was fed into the attached granulator and processed at 400° F., exposed to their extended venting system though no vacuum was applied. The melt was filtered with a 250 mesh back flush screen changer and pelletized with their underwater pelletizing system. The filter medium quickly clogged due to the degrading coating layer, and melt pressure continued to rise over the 30 minute run cycle. A sample of the screen can be seen in FIG. 2B which shows significant contamination on the screen pack.

The resultant pellets were then processed on a 12"-wide BOPP pilot line in a film similar to the original described above, except that the recycled pellets comprised 10 wt % of the core layer. The melt temperature of the main core was kept at 480° F. and the skin layers at 460° F. The dimples were measured by metallizing the film to improve the contrast and then evaluating within a 2" by 2" square. A dimple is a protrusion on the surface visible by the naked eye at 15 cm, and greater than 50 microns. The average dimple count within a 2" by 2" square of the BOPP extruded and metalized film was 116.

Comparative Example 2

Film of Comparative Example 1 was processed through the same NGR 85 mm S-GRAN® machine except that a vacuum of 3 mbar was achieved. The pellets were then processed on the pilot line and evaluated as described in Comparative Example 1. The average dimple count within a 2" by 2" square of the BOPP extruded and metalized film was 115.

Comparative Example 3

Film of Comparative Example 1 was processed through the same NGR 85 mm S-GRAN® machine except that a vacuum of 25 mbar was achieved. The pellets were then processed on the pilot line and evaluated as described in Comparative Example 1. The average dimple count within a 2" by 2" square of the BOPP extruded and metalized film was 93.

Comparing the average dimple counts within a 2" by 2" square of the BOPP extruded and metalized films of Comparative Examples 1, 2 and 3, one can conclude that the degree of vacuum at the vent port has negligible effect on the average dimple count within a 2" by 2" square of the BOPP extruded and metalized film.

Example 1

Figure 2A:
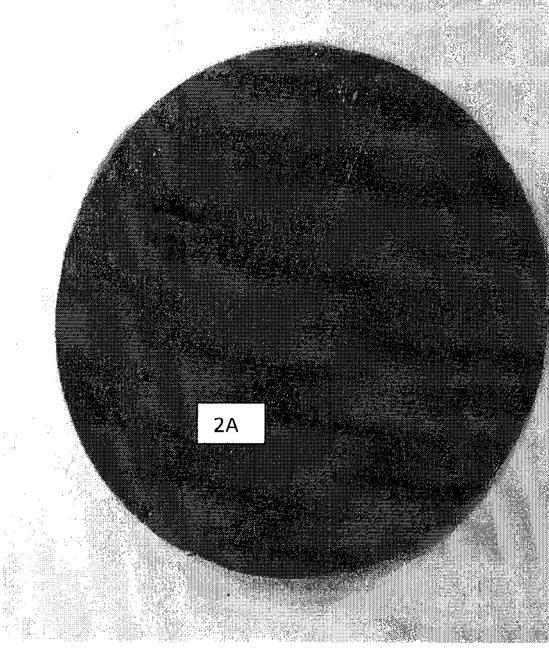
Figure 2B:
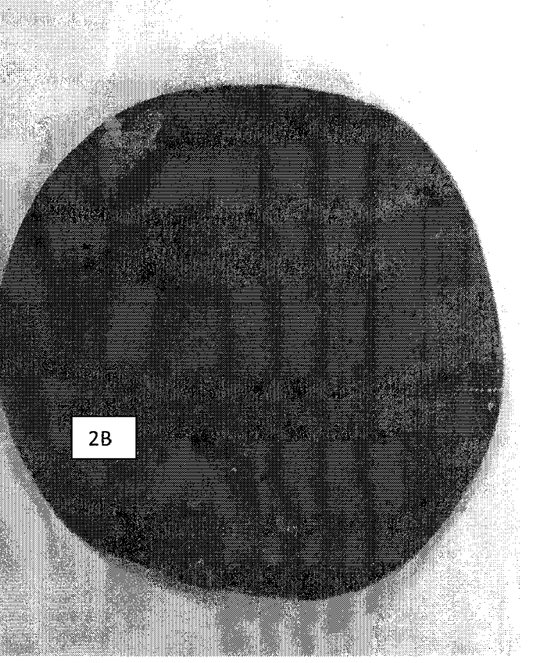

Film of Comparative Example 1 was processed through the same NGR 85 mm S-GRAN® machine that was fitted with a fine water spray that was added at the bottom of the grinding chamber such that water was sprayed on the film after shredding, just before the extruder inlet, which is shown in FIG. 6. The water was introduced at a 3.5 wt % of the recycled material, i.e., shredded film, and the first two zones were increased to 420° F. to counteract the cooling effect of the water. The extended venting zones were placed under a vacuum of 35 mbar. FIG. 2A shows the distinct difference that was observed with the melt filter as compared to Comparative Example 1. Example 1's screen pack exhibits significantly less degraded material and contaminants. This demonstrates that the crosslinked PVOH/EVOH system was successfully substantially uncrosslinked and some of the uncrosslinked material was removed through the vent system or blended into the final pellet.

The pellets were then processed on the pilot line and evaluated as described in Comparative Example 1. The average dimple count within a 2" by 2" square of the BOPP extruded and metalized film was 16.

Comparative Example 4

Film of Comparative Example 1 was processed through the same NGR 85 mm S-GRAN® machine. The water at a 2.5 wt % of the recycled material was introduced on the recycled film before shredding, which is shown in FIG. 6 and then directly extruded in NGR 85 mm S-GRAN® machine in which the first two zones were at 420° F. to counteract the cooling effect of the water. The extended venting zones were placed under a vacuum of 25 mbar.

The pellets were then processed on the pilot line and evaluated as described in Comparative Example 1. The average dimple count within a 2" by 2" square of the BOPP extruded and metalized film was 56.5.

As shown in FIG. 6, in CEx4 the water was directed onto these aggregated scrap materials before the grinding blades. In Ex1 the water was injected below the main grinding blades right before the conveying screw to the extruder. The difference is that in CEx4 the water was sprayed on the aggregate and did not sufficiently transfer to the individual layers, even with the grinding process, where in Ex1 after grinding water was more evenly distributed on the material. NGR extrusion process is patented under EP 1918084, incorporated herein in entirety by reference.

Comparing the average dimple count of the films of Example 1 and Comparative Example 4, one notices a significant difference in the average dimple count: 16 versus 56.6. This difference can be primarily attributed to the fact that in Example 1 the water was introduced on the recycled film before shredding just before the extruder inlet that melts and extrudes the recycled film, while in Comparative Example 4 the water was introduced on film before shredding.

Comparative Example 5

Film of example 1 was ground into fluff of about ⅜ inch in size. This was fed into a 40 mm Berstorff twin screw extruder with an L/D of 36. This had one conventional venting port that was opened to the atmosphere. This system is shown in FIG. 7.

Figure 7:
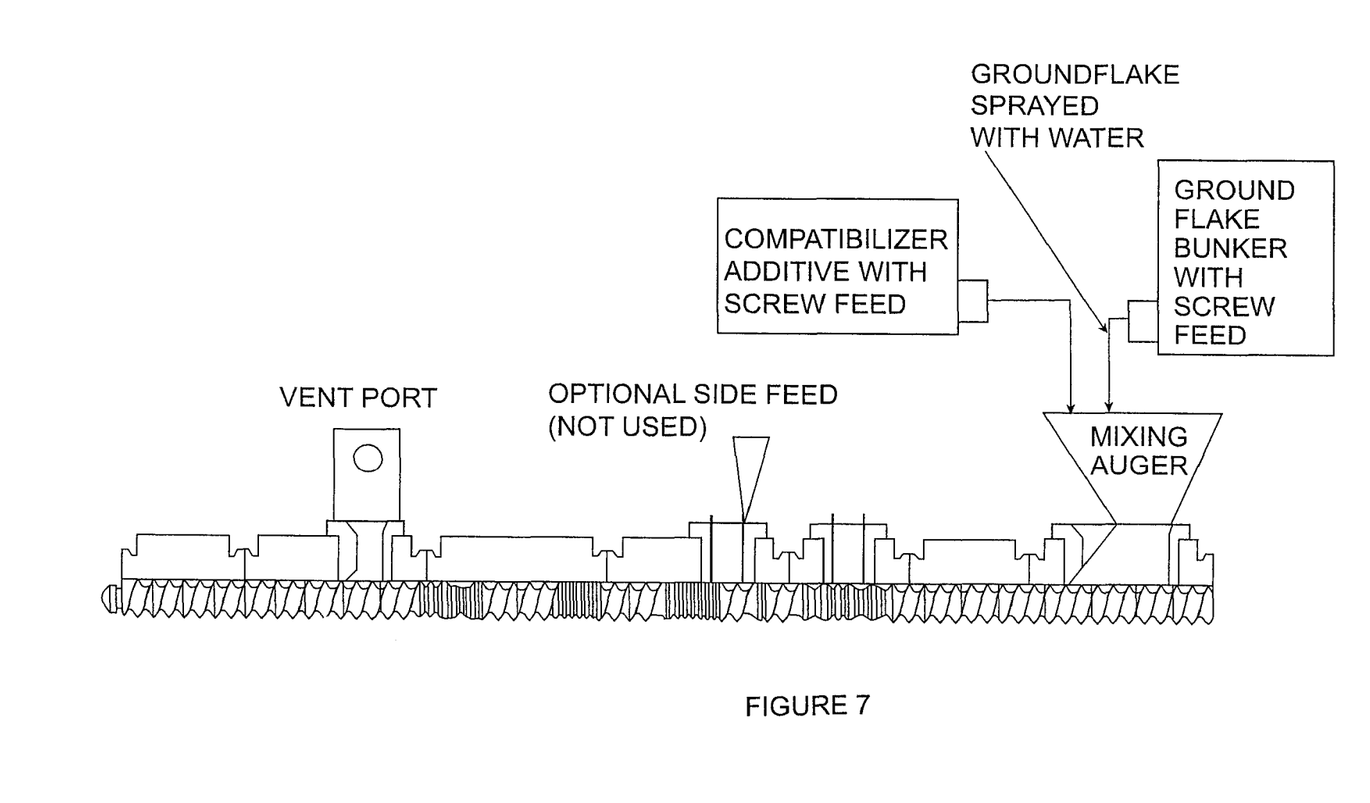
FIG. 7: Berstorff Twin Screw Testing Setup
Figure 8:
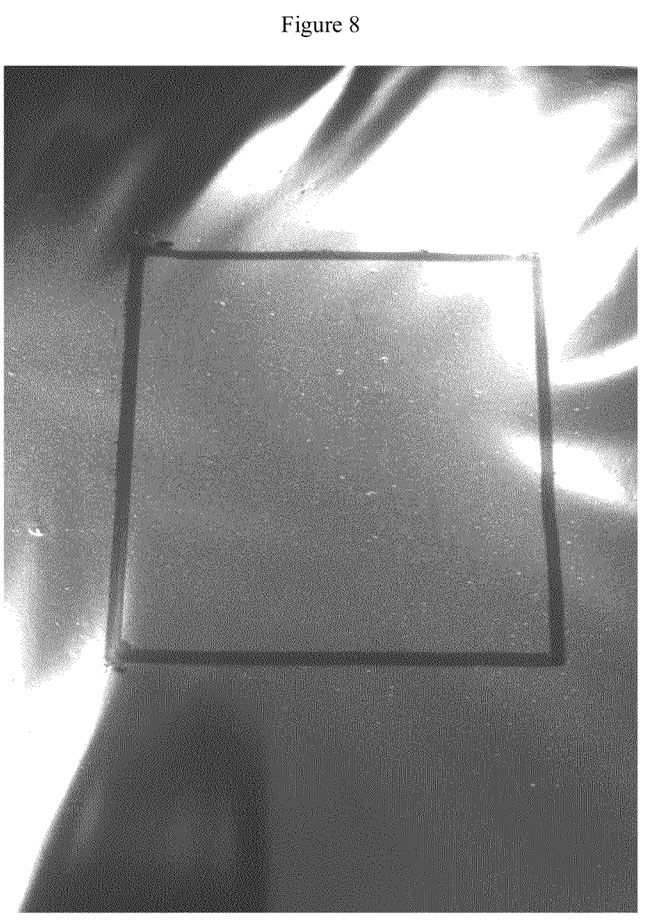
FIG. 8: Photograph of a surface of a polyolefin-containing film of an embodiment showing dimples on the surface.

FIG. 7 shows setup for Berstorff extrusion setup where pre-ground flake was staged in a bunker with a bottom screw feed that could be accurately metered. A mixing auger was placed into the feed throat of the extruder to insure good mixing of the flake and good flow, as flake can be prone to bridging. At the input of the extrusion feed throat the flake was sprayed with water.

The barrel temperature profile of Berstorff extrusion setup of FIG. 7 was kept between 300-320° F., and a 325 mesh screen was used in a standard breaker plate arrangement. Pelletizing was done via strand pelletizing and pellets were produced for further testing. The pellets were then processed on the pilot line and evaluated as described in Comparative Example 1. The average dimple count within a 2" by 2" square of the BOPP extruded and metalized film was 91.5.

Example 2

Film of Comparative Example 1 was run in the recycle process of Comparative Example 5, except that additive Nippon Gohsei Soaresin RG500 at a 5 wt % of the recycled material, i.e., shredded film, was added to the shredded/ground material prior to extrusion. The RG500 is described as a compablizer agent for recycling EVOH in PP. The pellets produced were then processed on the pilot line and evaluated as described in Comparative Example 1. The average dimple count within a 2" by 2" square of the BOPP extruded and metalized film was 51.5.

Example 3

Film of Comparative Example 1 was run in the recycle process of Comparative Example 5, except that water at a total of 8 wt % of the recycled material, i.e., shredded film, was introduced on shredded film at extruder inlet as follows: 2 wt % of water was introduced into the feed of the extruder, and an additional 6 wt % of water was introduced into a side feed near the start of the melt zone, for a total of 8 wt % water added. The 2 initial zones were increased 30° F. to counteract the cooling effect of the water, and the screen size was 250 mesh. The vent port was connected to a vacuum that achieved 82 mbar of pressure. The pellets produced were then processed on the pilot line and evaluated as described in Comparative Example 1. The average dimple count within a 2" by 2" square of the BOPP extruded and metalized film was 24.

Example 4

The film of Example 2 was made except that the vent port vacuum was 82 mbar instead of atmospheric pressure as in Example 2. The average dimple count within a 2" by 2" square of the BOPP extruded and metalized film was 50.

Comparing the average dimple counts within a 2" by 2" square of the BOPP extruded and metalized films of Examples 3 and 4, one can conclude that the degree of vacuum at the vent port has negligible effect on the average dimple count within a 2" by 2" square of the BOPP extruded and metalized film.

Example 5

The film of Example 2 was made except 5 wt % GF30 compatibilizing agent was used instead of RG500. The average dimple count within a 2" by 2" square of the BOPP extruded and metalized film was 42.

General Comments on Examples:

A summary of the dimple counts can be seen in Table 1.

TABLE 1

Summary of Examples and Comparative Examples

| | CEx 1 | CEx 2 | CEx 3 | Ex 1 | CEx 4 | CEx 5 | Ex 2 | Ex 3 | Ex 4 | Ex 4 |
|---|---|---|---|---|---|---|---|---|---|---|
| Machine | NGR Sgran 85 | NGR Sgran 85 | NGR Sgran 85 | NGR Sgran 85 | NGR Sgran 85 | Berstorff 40 TS | Berstorff 40 TS | Berstorff 40 TS | Berstorff 40 TS | Berstorff 40 TS |
| Additive | None | None | None | 3.5% Water | 2.5% Water | None | 5 wt % RG500 | 8 wt % Water | 5 wt % RG500 | 5 wt % GF30 |
| Vent Port Pressure | atm vent* | 3 mbar | 25 mbar | 35 mbar | 10 mbar | atm vent | atm vent | 82 mbar | 82 mbar | atm vent |
| Water Placement | n/a | n/a | n/a | on shredded film at extruder inlet | on film before shredding | n/a | n/a | on shredded film at extruder inlet | n/a | n/a |
| Dimple count average | 116 | 115 | 93 | 16 | 56.5 | 91.5 | 51.5 | 24 | 50 | 42 |

*atm vent means vented to atmosphere

As can be seen, there is a positive impact upon the addition of water and/or the Nippon Gohsei Soaresin RG500 compatibilizer into the recycled polyolefin material having crosslinked EVOH or PVOH polymers. While some dimples were present with the water addition method, the overall amount was much lower and may be deemed acceptable by customer evaluation.

Test Methods

Gel or dimple count was measured by taking 10"×8" film samples of the Example BOPP film containing the reprocessed/recycled coated film. The film was metallized in a bell-jar metallizer. A 2"×2" template was placed randomly upon the film sample. The number of gels/dimples within a 2"×2" square were counted by eye. The average number of gels/dimples measured in 3 film samples were reported. A dimple is a protrusion on the surface visible by the naked eye at 15 cm, and greater than 50 microns. Acceptable gel/dimple count was less than 30 dimples within the 2"×2" square; more acceptable was less than 20 dimples.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein in entirety by reference.

We claim:

1. A polyolefin-containing film comprising a solidified form of a melt, the melt comprising at least 1 weight percent shredded recycled crosslinked vinyl-alcohol polymer coated polyolefin material and an amount of an un-crosslinking agent configured to un-crosslink the crosslinked vinyl-alcohol in the melt, the polyolefin-containing film having an average dimple count of less than about 50 dimples/4 $in^2$.

2. The polyolefin-containing film of claim 1, wherein the polyolefin-containing film has an average dimple count of about 30 dimples/4 $in^2$.

3. The polyolefin-containing film of claim 1, wherein the melt contains at least 5 weight percent of the shredded recycled crosslinked vinyl-alcohol polymer coated polyolefin material.

4. The polyolefin-containing film of claim 1, wherein the compatibilizing agent comprises polyethylene grafted or copolymers that contain ester or acetate groups.

5. The polyolefin-containing film of claim 1, wherein the un-crosslinking agent comprises water.

6. The polyolefin-containing film of claim 1, wherein the shredded recycled crosslinked vinyl-alcohol polymer coated polyolefin material comprises both water and the compatibilizing agent.

7. The polyolefin-containing film of claim 1, wherein the melt comprises 1 to 10 parts by weight of the compatibilizing agent and/or 1 to 10 parts by weight of the un-crosslinking agent for 100 parts of the shredded recycled crosslinked vinyl-alcohol polymer coated polyolefin material.

8. The polyolefin-containing film of claim 1, wherein the vinyl-alcohol coated polymer comprises PVOH, EVOH, or blends thereof.

9. The polyolefin-containing film of claim 8, wherein the EVOH contains 10% ethylene or less.

10. A laminate film comprising the polyolefin-containing film of claim 1 and a metal-containing layer.

11. The polyolefin-containing film of claim 1, further comprising a compatibilizing agent.

12. A laminate film comprising the polyolefin-containing film of claim 11 and a metal-containing layer.

13. A polyolefin-containing film comprising a solidified form of a melt, the melt comprising at least 1 weight percent shredded recycled crosslinked vinyl-alcohol polymer coated polyolefin material and an amount of an un-crosslinking agent configured to un-crosslink the crosslinked vinyl-alcohol in the melt, wherein the polyolefin-containing film does not contain a compatibilizing agent, the polyolefin-containing film having an average dimple count of less than about 50 dimples/4 $in^2$.

14. A polyolefin-containing film comprising a solidified form of a melt, the melt comprising at least 1 weight percent shredded recycled crosslinked vinyl-alcohol polymer coated polyolefin material and an amount of an un-crosslinking agent configured to un-crosslink the crosslinked vinyl-alcohol in the melt, the polyolefin-containing film having an average dimple count of less than about 50 dimples/4 $in^2$.

15. The polyolefin-containing film of claim 13, wherein the melt contains at least 5 weight percent of the shredded recycled crosslinked vinyl-alcohol polymer coated polyolefin material.

16. A laminate film comprising the polyolefin-containing film of claim 13 and a metal-containing layer.

17. The polyolefin-containing film of claim 14, wherein the melt contains at least 5 weight percent of the shredded recycled crosslinked vinyl-alcohol polymer coated polyolefin material.

18. A laminate film comprising the polyolefin-containing film of claim 14 and a metal-containing layer.

* * * * *